US008912731B2

(12) United States Patent
Zhang et al.

(10) Patent No.: US 8,912,731 B2
(45) Date of Patent: Dec. 16, 2014

(54) LED BACKLIGHT DRIVING CIRCUIT AND BACKLIGHT MODULE

(71) Applicant: Shenzhen China Star Optoelectronics Technology Co., Ltd., Shenzhen, Guangdong (CN)

(72) Inventors: Hua Zhang, Shenzhen (CN); Xianming Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 37 days.

(21) Appl. No.: 13/884,294

(22) PCT Filed: Apr. 2, 2013

(86) PCT No.: PCT/CN2013/073605
§ 371 (c)(1),
(2), (4) Date: May 9, 2013

(87) PCT Pub. No.: WO2014/153787
PCT Pub. Date: Oct. 2, 2014

(65) Prior Publication Data
US 2014/0292202 A1    Oct. 2, 2014

(30) Foreign Application Priority Data
Mar. 27, 2013  (CN) .......................... 2013 1 0102384

(51) Int. Cl.
*H05B 33/00*    (2006.01)
*H05B 33/08*    (2006.01)

(52) U.S. Cl.
CPC .................................. *H05B 33/089* (2013.01)
USPC ........................... 315/224; 315/122; 315/307

(58) Field of Classification Search
CPC ........ H05B 33/00; H05B 33/02; H05B 33/08;
H05B 33/0806; H05B 33/0815; H05B
33/0839; H05B 33/0842; H05B 33/0851;
H05B 33/0875; H05B 33/0878; H05B
33/0881; H05B 33/0884
USPC .......... 315/291, 307, 224, 308, 119, 121, 122
See application file for complete search history.

(56) References Cited

U.S. PATENT DOCUMENTS

| | | | |
|---|---|---|---|
| 7,265,504 B2 * | 9/2007 | Grant ............................ | 315/308 |
| 7,688,002 B2 * | 3/2010 | Ashdown et al. ............. | 315/291 |
| 2009/0085501 A1 * | 4/2009 | Cross ............................ | 315/307 |

* cited by examiner

*Primary Examiner* — David H Vu
(74) *Attorney, Agent, or Firm* — Andrew C. Cheng (57) ABSTRACT

An LED backlight driving circuit has a voltage converting unit having an output terminal connected to a positive electrode of an LED to provide a driving voltage required by the LED, a driving unit to control the voltage converting unit to achieve a voltage conversion, and a protection unit connected in series between a negative electrode of the LED and the driving unit. A maximum allowable power of the protection unit is less than a power when the driving voltage of the LED is directly applied to the protection unit. The circuit also includes a control unit for outputting a control signal for stopping working to the driving unit when the protection unit forms an open circuit. Thus, the circuit parts can be protected, and the short-circuit protection function is more safe and reliable.

16 Claims, 3 Drawing Sheets

LED BACKLIGHT DRIVING CIRCUIT AND BACKLIGHT MODULE

BACKGROUND OF THE INVENTION

1. Field of the Invention

The present invention relates to the field of semiconductor technology, and more particularly to an LED backlight driving circuit and a backlight module.

2. Description of Related Art

The LCD display panel cannot generate the light source, and it have to use backlight method to project the light onto the display panel such that the display panel generate the brightness, and the brightness is uniformly distributed in order to display a picture. At present, the backlight source of the LCD display panel uses the LED or the CCFL. Comparing to the CCFL for the backlight source, the LED backlight source has the advantages of low power consumption, long life, ultra-thin and good optical characteristic, etc. Therefore, the liquid crystal display using white LED as the backlight source gradually becomes the development direction of the LCD TV.

In order to ensure the performance of the LED backlight module and to avoid the failure of the LED backlight module which causes the LCD device cannot display, the protection mechanism for the LED backlight driving circuit is important. In the LED backlight driving circuit, the output high voltage is connected to the positive electrode of the LED to drive the LED for emitting light. When the positive and negative electrodes of the LED are shorted, the high output voltage will directly enter the LED constant current driving IC and other parts from the negative electrode of the LED, so that it cause the parts being burned out, which causes the LED backlight driving circuit work abnormally.

Figure 1:
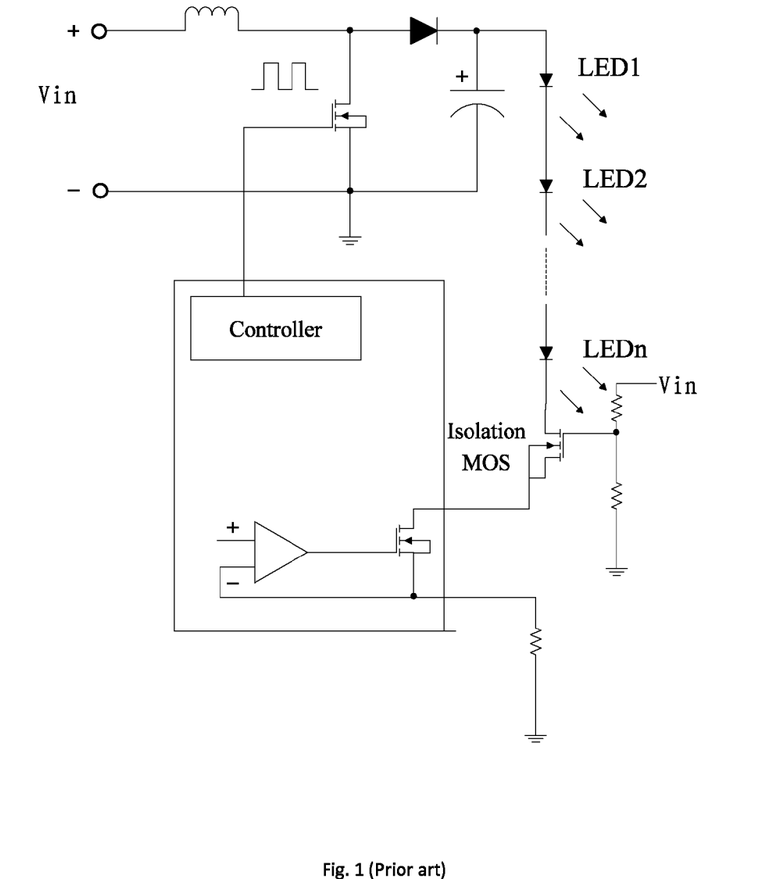
FIG. 1 is a schematic circuit diagram of an LED backlight driving circuit according to the prior art.

In order to solve the above problems, as shown in FIG. 1, in the prior art, an isolation MOS (Metal-Oxide-Semiconductor, a field effect transistor) is usually added to the negative electrode of the LED. The source of the MOS is connected to the negative electrode of the LED. The drain is connected to the LED constant current driving IC. The gate is connected to an external DC working voltage to control the MOS transistor to conduct when the LED backlight driving circuit is operating normally. When the positive and negative electrodes of the LED are shorted, the source voltage of the MOS is higher than the gate voltage such that the MOS is disconnected in order to prevent the high voltage enter into the LED constant current driving IC as well as the rear parts to protect the entire circuit.

Although the function of the MOS transistor can protect the LED backlight driving circuit, when the LED backlight driving circuit is operating normally, the MOS transistor is turned, the larger power loss occurs at the MOS transistor. And the temperature of the MOS transistor is higher, which affects its life. Furthermore, the price of the MOS transistor is higher, which is not conducive to cost reduction. In addition, when MOS transistor is disconnected, the negative electrode of the LED still exist a high voltage, which will cause some security risks.

SUMMARY OF THE INVENTION

The technical problem solved by the present invention is to provide an LED backlight driving circuit and a backlight module, which can protect the circuit parts from being damaged and make the short-circuit protection function of the LED be more secure and reliable.

In order to solve the above-mentioned technical problem, a technical solution provided by the present invention is: an LED backlight driving circuit comprising: a voltage converting unit having an input terminal connected to an output terminal of an external power supply and an output terminal connected to a positive electrode of an LED, wherein the voltage converting unit is for converting an output voltage of the external power supply into a driving voltage required by the LED; a driving unit having an output terminal connected to a controlled terminal of the voltage converting unit for driving the voltage converting unit to achieve a voltage conversion; a protection unit connected in series between a negative electrode of the LED and a first input terminal of the driving unit; a current detection unit connected to a second input terminal of the driving unit for connecting to the circuit protection on unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and a control unit having an input terminal connected to the negative electrode of the LED and an output terminal connected to a third input terminal of the driving unit, wherein the control unit is for outputting a control signal for stopping working to the driving unit when the protection unit forms the open circuit; wherein, driving unit comprises a controller, a first comparator, and a first switching transistor, wherein an output terminal of the controller functions as the output terminal of the driving unit and connects to the controlled terminal of the voltage converting unit, and an input terminal of the controller functions as the third input terminal of the driving unit and connects to the control unit; a positive input terminal of the first comparator is for inputting a first preset voltage, and a negative input terminal of the first comparator functions as the second input terminal of the driving unit and connects to the current detection unit; an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator; and the control unit is a second comparator, and an negative input terminal of the second comparator connects to the negative electrode of the LED, and a positive input terminal of the second comparator is for inputting a second preset voltage, and an output terminal of the second comparator functions as the output terminal of the control unit and connects to the third input terminal of the driving unit.

Wherein, the protection unit is a first resistor which has a resistance less than a preset value, and the first resistor has two terminals, and one terminal of the first resistor connects to the negative electrode of the LED, and the other terminal of the first resistor connects to the first input terminal of driving unit; and the current detection unit is a second resistor, and the second resistor has two terminals, and one terminal of the second resistor connects to the second input terminal of the driving unit, and the other terminal of the second resistor is grounded.

Wherein, the voltage converting unit is an inductive boost circuit, and includes a boost inductor, a second switching transistor, a rectifier diode and a discharge capacitor; wherein, one terminal of the boost inductor is as the input terminal of the voltage converting unit for connecting the output terminal of the external power supply, and the other terminal of the boost inductor connects to a positive electrode of the rectifier diode, and a negative electrode of the rectifier diode is as the output terminal of voltage converting unit and connects to the positive electrode of the LED, and a control terminal of the second switching transistor is as the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge the capacitor is grounded.

Wherein, the first switching transistor and the second switching transistor are all thin-film-field-effect transistors, and each control terminal or switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

In order to solve the above-mentioned technical problem, another technical solution provided by the present invention is: an LED backlight driving circuit comprising: a voltage converting unit having an input terminal connected to an output terminal of an external power supply and an output terminal connected to a positive electrode of an LED, wherein the voltage converting unit is for converting an output voltage of the external power supply into a driving voltage required by the LED; a driving unit having an output terminal connected to a controlled terminal of the voltage converting unit for driving the voltage converting unit to achieve a voltage conversion; a protection unit connected in series between a negative electrode of the LED and a first input terminal of the driving unit; a current detection unit connected to a second input terminal of the driving unit for connecting to the circuit protection unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and a control unit having an input terminal connected to the negative electrode of the LED and an output terminal connected to a third input terminal of the driving unit, wherein the control unit is for outputting a control signal for stopping working to the driving unit when the protection unit forms the open circuit.

Wherein, the protection unit is a first resistor which has a resistance less than a preset value, and the first resistor has two terminals, and one terminal of the first resistor connects to the negative electrode of the LED, and the other terminal of the first resistor connects to the first input terminal of driving unit; and the current detection unit is a second resistor, and the second resistor has two terminals, and one terminal of the second resistor connects to the second input terminal of the driving unit, and the other terminal of the second resistor is grounded.

Wherein, the driving unit comprises a controller, a first comparator, and a first switching transistor, wherein an output terminal of controller functions as the output terminal of the driving unit and connects to the controlled terminal of the voltage converting unit, and an input terminal of the controller functions as the third input terminal of the driving unit and connects to the control unit; a positive input terminal of the first comparator is for inputting a first preset voltage, and a negative input terminal of the first comparator functions as the second input terminal of the driving unit and connects to the current detection unit; an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator.

Wherein, the voltage converting unit is an inductive boost circuit, and includes a boost inductor, a second switching transistor, a rectifier diode and a discharge capacitor; wherein, one terminal of the boost inductor is as the input terminal of the voltage converting unit for connecting the output terminal of the external power supply, and the other terminal of the boost inductor connects to a positive electrode of the rectifier diode, and a negative electrode of the rectifier diode is as the output terminal of the voltage converting unit and connects to the positive electrode of the LED, and a control terminal of the second switching transistor is as the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge the capacitor is grounded.

Wherein, the first switching transistor and the second switching transistor are all thin-film-field-effect transistors, and each control terminal of switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

Wherein, the control unit is a second comparator, and an negative input terminal of the second comparator connects to the negative electrode of the LED, and a positive input terminal of the second comparator is inputting a second preset voltage, and an output terminal of the second comparator functions as the output terminal of the control unit and connects to the third input terminal of the driving unit.

In order to solve the above-mentioned technical problem, another technical solution provided by the present invention is: an LED backlight module, comprising an LED; and an LED backlight driving circuit comprising: a voltage converting unit having an input terminal connected to an output terminal of an external power supply and an output terminal connected to a positive electrode of an LED, wherein the voltage converting unit is for converting an output voltage of the external power supply into a driving voltage required by the LED; a driving unit having an output terminal connected to a controlled terminal of the voltage converting unit for driving the voltage converting unit to achieve a voltage conversion; a protection unit connected in series between a negative electrode of the LED and a first input terminal of the driving unit; a current detection unit connected to a second input terminal of the driving unit for connecting to the circuit protection unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and a control unit having an input terminal connected to the negative electrode of the LED and an output terminal connected to a third input terminal of the driving unit, wherein the control unit is for outputting a control signal for stopping working to the driving unit when the protection unit forms the open circuit.

Wherein, the protection unit is a first resistor which has a resistance less than a preset value, and the first resistor has two terminals, and one terminal of the first resistor connects to the negative electrode of the LED, and the other terminal of the first resistor connects to the first input terminal of driving unit; and the current detection unit is a second resistor, and the second resistor has two terminals, and one terminal of the second resistor connects to the second input terminal of the driving unit, and the other terminal of the second resistor is grounded.

Wherein, the driving unit comprises a controller, a first comparator, and a first switching transistor, wherein an output terminal of the controller functions as the output terminal of the driving unit and connects to the controlled terminal of the voltage converting unit, and an input terminal of the controller functions as the third input terminal of the driving unit and connects to the control unit; a positive input terminal of the first comparator is for inputting a first preset voltage, and a negative input terminal of the first comparator functions as the second input terminal of the driving unit and connects to the current detection unit; an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator.

Wherein, the voltage converting unit is an inductive boost circuit, and includes a boost inductor, a second switching transistor, a rectifier diode and a discharge capacitor; wherein, one terminal of the boost inductor is as the input terminal of the voltage converting unit for connecting the output terminal of the external power supply, and the other terminal of the boost inductor connects to a positive electrode of the rectifier diode, and a negative electrode of the rectifier diode is as the output terminal of the voltage converting unit and connects to the positive electrode of the LED, and a control terminal of the second switching transistor is as the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge capacitor is grounded.

Wherein, the first switching transistor and the second switching transistor are all thin-film-field-effect transistors, and each control terminal of switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

Wherein, the control unit is a second comparator, and an negative input terminal of the second comparator connects to the negative electrode of the LED, and a positive input terminal of the second comparator is for inputting a second preset voltage, and an output terminal of the second comparator functions as the output terminal of the control unit and connects to the third input terminal of the driving unit.

The beneficial effects of the present invention are: comparing to the prior art, the LED backlight driving circuit comprising: a voltage converting unit having an input terminal connected to an output terminal of an external power supply and an output terminal connected to a positive electrode of an LED, wherein the voltage converting unit is for converting an output voltage of the external power supply into a driving voltage required by the LED, a driving unit having an output terminal connected to a controlled terminal of the voltage converting unit for driving the voltage converting unit to achieve a voltage conversion, a protection unit connected in series between a negative electrode of the LED and a first input terminal of the driving unit, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit such that it cuts the driving voltage to enter the driving unit in order to effectively protect the driving unit. At the same time, a control unit outputs a control signal for stopping working to the driving unit when the protection unit forms the open circuit in order to make the voltage converting unit stop working such that the entire circuit stop working such that the short-circuit protection function of the LED is more secure and reliable.

DETAILED DESCRIPTION OF THE PREFERRED EMBODIMENT

The following content combines with the drawings and the embodiment for describing the present invention in detail.

Figure 2:
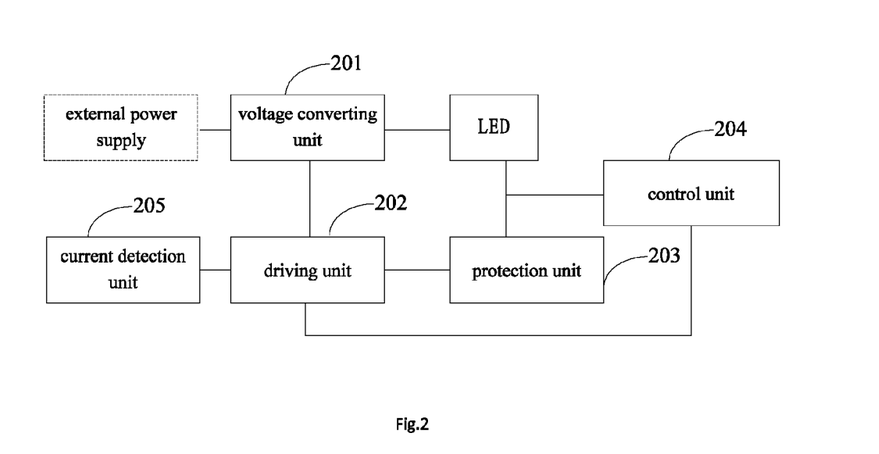
FIG. 2 is a schematic circuit diagram of an LED backlight driving circuit according to an embodiment of the present invention.

With reference to FIG. 2, in an LED backlight driving circuit according to an embodiment of the present invention, the LED backlight driving circuit includes a voltage converting unit 201, a driving unit 202, a protection unit 203, a control unit 204, and a current detection unit 205. Wherein, the voltage converting unit 201 includes an input terminal, an output terminal and a controlled terminal. The input terminal is used for connecting to an output terminal of an external power supply. The output terminal of the voltage converting unit 201 is used for connecting a positive electrode of the LED to provide a driving voltage to the LED. The driving unit 202 includes an output terminal and three input terminals, and its output terminal connects to the controlled terminal of the voltage converting unit 201 for driving the voltage converting unit 201 to achieve a voltage conversion such that the voltage converting unit 201 can convert the output voltage of the external power supply to the driving voltage required by the LED.

The circuit protection unit 203 is connected in series between the negative electrode of the LED and the first input terminal of the driving unit 202. The current detection unit 205 connects to a second input terminal of the driving unit 202. A third input terminal of the driving unit 202 connects to the output terminal of the control unit 204. The input terminal of the control unit 204 connected to the negative electrode of the LED.

A display screen using the LED as a backlight source usually requires multiple LEDs to form the backlight source. There are several connection ways for the multiple LEDs, and different connection ways use different driving circuits. In the present embodiment, the LED backlight driving circuit is a series type backlight driving circuit, that is, the multiple LEDs are connected in series. The series type backlight driving circuit can make currents flowing through each LED be equal under any working conditions, that is, the brightness of the multiple LEDs are always consistent. And the LEDs under normal operation usually require meeting two conditions. One is that the forward voltage drops across the LEDs are sufficient, that is, the voltage applied across the two terminals of each LED shall be greater than the forward voltage. The other is that an appropriate currents flows through the LEDs. The brightness of the LEDs is determined by the current flowing through them. Therefore, when the multiple LEDs are in series, it requires the LED backlight driving circuit providing higher driving voltage according to the characteristic of the voltage dividing of the series connection such that the voltage across each LED can obtain the required forward voltage.

In the present embodiment, it uses driving multiple LEDs as an example for illustrating. The voltage converting unit 201 is a boost driving circuit for converting the output voltage of the external power supply to the driving voltage required to driving the multiple LEDs (LED string), and the driving voltage is higher than the output voltage of the external power supply. The driving unit 202 is for outputting a driving signal to the voltage converting unit 201 to control the voltage converting unit 201 to achieve the voltage conversion. The current detection unit 205 connects to the circuit protection unit 203 through the driving unit 202 for detecting a value of a current flowing through the LED string and feeds back the detected current value to the driving unit 202. The driving unit 202 adjusts the current flowing through the LED string according to the feedback current of the current detection unit 202 so as to satisfy the demand of the LED brightness. The circuit protection unit 203 is for overvoltage protection of the LED backlight driving circuit 203. Its maximum allowable power is less than a power when the driving voltage of the LED is directly applied to it.

Specifically, when the positive and negative electrodes of the LED are shorted, that is, the output terminal of the voltage converting unit 201 is directly connected to the circuit protection unit 203 so that the driving voltage provided by the voltage converting unit 201 to the LED string is applied on the circuit protection unit 203. At this time, the power applied to the circuit protection unit 203 is greater than the maximum power allowed by the circuit protection unit 203. Therefore, the circuit protection unit 203 is burned out to form an open circuit so as to cut off the connection between the LED string and the driving unit 202 such that the driving voltage of the LED does not enter the driving unit 202 to protect the rear circuit parts from being damaged.

In addition, the control unit 204 is used for to sending a control signal for stopping working when the positive and negative electrodes of the LED are shorted to control the driving unit 202 to stop working. After the driving unit 202 stops working, it cannot send the driving signal to the voltage converting unit 201 so that the voltage converting unit 201 is unable to perform the voltage conversion, that is, the entire circuit stops working, and the voltage converting unit 201 is no longer outputting a high driving voltage. Therefore, it reduces the high voltage safety hazard so that the short-circuit protection function of the LED string is more secure and reliable.

Figure 3:
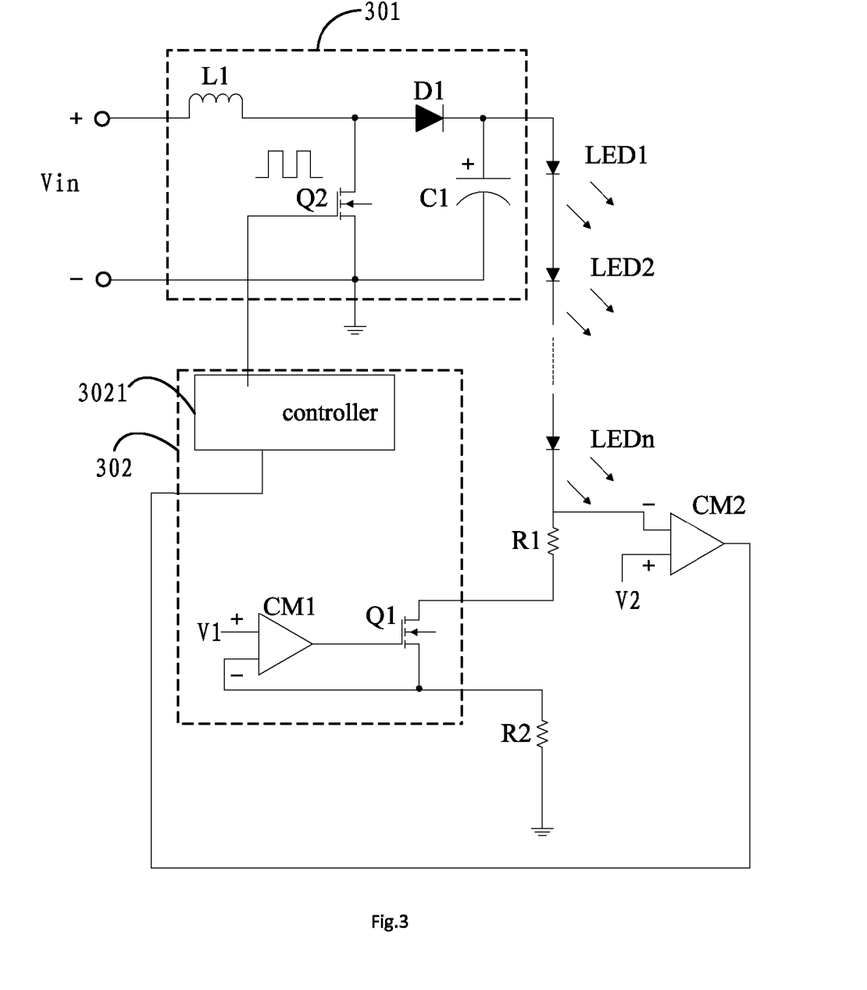
FIG. 3 is a specific circuit diagram of an LED backlight driving circuit according to an embodiment of the present invention.

With reference to FIG. 3, it is a specific circuit diagram of an LED backlight driving circuit according to an embodiment of the present invention. In the present embodiment, the function of the driving unit 302 can be realized by a constant current LED driving IC, and it comprises a controller 3021, a first comparator CM1, and a first switching transistor Q1, wherein the controller 3021 is used for outputting the driving signal, the first comparator CM1 and first switch Q1 are used for adjusting the brightness of the LED backlight driving circuit. A voltage converting unit 301 is an inductive boost circuit, which includes a boost inductor L1, a second switching transistor Q2, a rectifier diode D1 and a discharge capacitor C1. A first resistor R1 is the protection unit of the LED backlight driving circuit. A second resistor R2 is the current detection unit. A second comparator CM2 is the control unit.

In the present embodiment, the first switching transistor Q1 and the second switching transistor Q2 are thin-film-field-effect transistors. Each of the control terminals of the switching transistor Q1, Q2 is the gate of thin-film-field-effect transistor, and the input terminals and the output terminals of the switch Q1, Q2 are respectively corresponding to the drains and the sources of the thin-film-field-effect transistors. Of course, in other embodiments, the switching transistor Q1, Q2 also can be BJTs or Darlington transistors.

Wherein, one terminal of the boost inductor L1 is as an input terminal of the voltage converting unit 301 for connecting an external power supply Vin. The other terminal of the boost inductor L1 connects to the positive electrode of the rectifier diode D1. The negative electrode of the rectifier diode D1 is as the output terminal of the voltage converting unit 301 and connects to the positive electrode of the LED string. A control terminal of the second switching transistor Q2 as the controlled terminal of the voltage converting unit 301 and connects to the output terminal of the controller 3021. The input terminal of the second switching transistor Q2 connects to the positive electrode of the rectifier diode D1, and the output terminal is grounded. One terminal of a discharge capacitor C1 connects to the negative electrode of the rectifier diode D1 and the other terminal of the discharge capacitor C1 is grounded, wherein the terminal of the discharge capacitor C1 connected to the rectifier diode D1 is a positive electrode in order to achieve the charging and discharging. The terminal of the discharge capacitor C1 connected to the ground is the negative electrode.

The output terminal of the controller 3021 is as the output terminal of the driving unit 302 and connects to the control terminal of the second switching transistor Q2. The positive input terminal of the first comparator CM1 is for inputting a first preset voltage V2, the negative input terminal of the first comparator CM1 is as the second input terminal of the driving unit 302 and connects to one terminal of the second resistor R2, the other terminal of the second resistor R2 is grounded. The output terminal of the first comparator CM1 connects to the control terminal of the first switching transistor Q1.

The input terminal of the first switch Q1 is as a first input terminal of driving unit 302 and connects to one terminal of the first resistor R1 and the output terminal of the first switching transistor Q1 connects to the negative input terminal of the first comparator CM1. The other terminal of the first resistor R1 connects to the negative electrode of the LED string. The second comparator CM2 is as the driving circuit control unit for LED backlight driving circuit. The positive input terminal of the second comparator CM2 is for inputting a second preset voltage V2. The negative input terminal of the second comparator CM2 functions as the input terminal of the control unit and connects to the negative electrode of the LED string. The output terminal of the second comparator CM2 functions as the output terminal of the driving unit and connects to a third input terminal of the driving unit 302. The third input terminal of the driving unit 302 is an enable signal input terminal, and also an input terminal of the controller 3021.

Wherein, the first preset voltage V1 can be generated by an internal circuit of the driving unit 302. When the current flowing through the LED string is smaller, the first preset voltage V1 is also smaller, typically about 500 mV. And the second preset voltage V2 is smaller than the driving voltage of the LED string and greater than the voltage of the negative electrode of the LED string when it is working normally. When the LED string works normally, the voltage at the negative electrode of the LED string is generally less than 5V. Therefore, the second preset voltage V2 can be set between 10V~20V, and is smaller than the driving voltage of the LED string.

By the LED backlight driving circuit of the present embodiment, it is possible to effectively protect the circuit parts from being damaged. Specifically, the external power supply Vin provides an output voltage for the voltage converting unit 301. The output driving signal of the controller 3021 is a square wave pulse signal to control the conduction and cutoff of the second switching transistor Q2 in order to achieve the voltage converting function of the voltage converting unit 301, and to make the voltage converting unit 301 eventually reach a stable output driving voltage state.

At the initial stage of driving the LED string, the controller 3021 firstly outputs a high level voltage, and the second switching transistor Q2 is turned on. The boost inductor L1 converts the electric energy into magnetic energy and stores it. This is a process for the boost inductor L1 to convert the electric energy into the magnetic energy. Subsequently, the controller 3021 outputs a low level voltage, and the second switch transistor Q2 is turned off. The magnetic energy stored in the boost inductor L1 is converted into the electric energy, and output the driving voltage to the LED string. The driving voltage is a voltage superposition of the output voltage of the external power supply Vin and the electric energy converted from the magnetic energy by the boost inductor L1. Therefore, the driving voltage of the LED string is higher than the output voltage of the external power supply Vin, and the voltage converting unit 301 completes a process of voltage boost.

When the second switching transistor Q2 is turned off, the driving voltage provided by the voltage converting unit 301 supplies the driving voltage to the LED string through the rectifier diode D1 to drive the LED string for lighting, and charges to the capacitor C1 at the same time. The driving voltage outputted by the voltage converting unit 301 become a smooth DC voltage and providing to the LED string after filtering by the rectifier diode D1.

In the next cycle of outputting the driving signal by the controller 3021, the second switching transistor Q2 is turned on, and the boost inductor L1 performs an energy storage process, while the discharging capacitor C1 discharges to the LED string to provide the required driving voltage for the LED string. In the subsequent process, the controller 3021 provides the driving signal to the second switching transistor Q2 such that the second switching transistor Q2 is periodically turned on and off. When it is turned on, the boost inductor converts the electric energy into the magnetic energy and stored, and providing a driving voltage to the LED string by the discharging capacitor C1. At this time, the rectifier diode D1 has an isolation function, and its positive electrode voltage is lower than the negative electrode voltage, and the rectifier diode D1 is reversely cut off so that the process of storing energy of the boost inductor L1 does not affect the discharging capacitor C1 to supply energy for the LED string; When the second switching transistor Q2 is turned off, the boost inductor L1 converts the magnetic energy into the electric and supplies driving voltage to LED string output and charges the discharging capacitor C1 at the same time. Thus, the voltage converting unit 301 achieves providing the driving voltage the LED string.

The first comparator CM1 of the driving unit 302 and the first switching transistor Q1 are used for adjusting the brightness of the LED strings, while the brightness of the LED string relates to the current flowing through the LED string. The current flowing through the LED string is equal to the ratio of the driving voltage to the resistance sum of the LED string, the first resistor R1, first switching transistor Q1 and the second resistor R2. Any Change of the resistance of the LED strings, the first resistor R1, the first switching transistor Q1 and the second resistor R2 will affect the value of the current flowing through the LED string.

When the LED string works normally, the value of the current flowing through the LED string should be equal to a ratio of the first preset voltage V1 at the positive input terminal of the first comparator CM1 to the second resistor R2. And the ratio is defined as a preset current value of the current flowing through the LED string. The first switching transistor Q1 is a thin film field effect transistor. The impedance between the input terminal of the first switching transistor Q1 and the output terminal changes with different input voltages at the control terminal and affects the value of the current flowing through the LED string so as to influence the brightness of the LED string. In the initial stage of driving the LED string, the current flowing through the LED string has not reached a steady state yet, and the function of the second resistor R2 is transferring the current flowing through the LED string into a voltage signal and feeds back to the negative input terminal of the first comparator CM1. The voltage signal is the voltage across the two terminals of the second resistor R2.

The first comparator CM1 compares the voltage across the second resistor R2 and the first preset voltage V1 at the positive input terminal. When the voltage across the second resistor R2 is less than the first preset voltage V1, it indicates that the actual current flowing through the LED string is less than the preset value. At this time, the first comparator CM1 outputs the comparison result to the control terminal of the first switching transistor Q1 to control the conduction impedance of the first switching transistor Q1, that is, the impedance between the input terminal and the output terminal of the first switching transistor Q1 such that the impedance between the input terminal and the output terminal of the first switching transistor Q1 will be reduced. Therefore, the current flowing through the LED string will increase until the voltage of the second resistor R2 is equal to the first preset voltage V1 so that the actual current flowing through the LED string is equal to the preset current value.

The voltages at the positive input terminal and negative input terminal of the first comparator CM1 are equal so that the first comparator the CM1 maintains the conduction impedance of the first switching Q1 to make the current of the LED string be constant. When the voltage across the second resistor R2 is greater than the first preset voltage V1, it indicates that the actual current flowing through the LED string is greater than the preset current value. At this time, the first comparator CM1 outputs the comparison result to the control terminal of the first switching transistor Q1 to control the conduction impedance of the first switching transistor Q1, that is, the impedance between the input terminal and the output terminal of the first switching transistor Q1 such that the impedance between the input terminal and the output terminal of the first switching transistor Q1 will be increased. Therefore, the current flowing through the LED string will decrease until the voltage of the second resistor R2 is equal to the first preset voltage V1 so that the actual current flowing through the LED string is equal to the preset current value.

Through the cooperation of the first comparator CM1 and the first switching transistor Q1, it eventually make the current flowing through the LED string be constant and equal to the preset current value. Thereby, it realizes the brightness adjustment of the LED string at the initial stage.

When the LED string work normally, in order to guarantee that the voltage drop of the first resistor R1 does not affect the whole circuit, it selects the first resistor R1 to have a smaller resistance and the resistance is less than a preset value. When the positive and negative terminals of the LED string are short, the driving voltage outputted by the voltage converting unit 301 is directly applied to the first resistor R1. The resistance of the first resistor R1 is less than the preset value. The preset value is determined according to the actual driving voltage of the LED string, that is, the maximum allowable power of the first resistor R1 is less than the actual power applying on the first resistor R1 when the driving voltage is directly applied to it. Therefore, when the positive and negative electrodes of the LED string are shorted, the actual power applying on the first resistor R1 is greater than its maximum allowable power, which leads to the first resistor R1 to be burned out in order to form an open circuit so that it cuts off a connection between the negative electrode of the LED string and the driving unit 302. Therefore, a high voltage at the negative electrode of the LED string will not apply to the driving unit 302 to protect the driving unit 302 from being damaged.

When the first resistor R1 is burned out to form the open circuit, the voltage at the negative electrode of the LED string reaches the driving voltage, that is, the input voltage at the negative input terminal of the second comparator CM2 is the driving voltage. The second comparator CM2 compares the second preset voltage V2 at the positive input terminal with the driving voltage at the negative input terminal. Because the second preset voltage V2 is less than the driving voltage, the driving voltage at the negative input terminal is greater than the second preset voltage V2 at the positive input terminal. The second comparator CM2 outputs a low level voltage, and the low level voltage inputs to an enable signal input terminal of the driving unit 302 so that the enable signal of the driving unit 302 becomes low so that the driving unit 302 stops working, and it no longer outputs the driving signal to the second switching transistor Q2. The voltage converting unit 301 is no longer converting voltage, and the output voltage of the voltage converting unit 301 is reduced, that is, the negative electrode of the LED string no longer has the high driving voltage such that the short circuit protection of the positive and negative electrode of the LED string is more secure and reliable.

It is worth noting that the circuit protection unit of the present embodiment also may be a fuse or other over-voltage protection circuit, not limiting to the resistor R1 having the smaller resistance, to form an open circuit to cut off the high driving voltage applying on the rear-stage circuit parts when the positive and negative electrodes of the LED string are shorted. Therefore, it protects the rear-stage circuit parts from being damaged. Furthermore, the control unit is not limited to the above-mentioned comparator CM2. It may be a voltage detection circuit or other voltage trigger circuits so as to output a control signal with a low level voltage to pull down the enable signal of the driving unit, and controls the driving unit to stop working when it detects that the voltage at the negative electrode of the LED string is the driving voltage of the LED string.

The present embodiment use the first resistor R1 to instead of the isolation MOS transistor in the conventional art and use the first resistor R1 as the circuit protection unit when the LED string is shorted. Therefore, it can effectively protect the circuit parts from being damaged and also help to reduce costs. At the same time, by adding the second comparator CM2, when the positive and negative electrodes of the LED string are shorted, it is possible to control the driving unit 302 to stop working such that the voltage converting unit 301 no longer outputs the high driving voltage to reduce the safety hazard of the high voltage.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An LED backlight driving circuit comprising:
a voltage converting unit having an input terminal connected to an output terminal of an external power supply and an output terminal connected to a positive electrode of an LED, wherein the voltage converting unit is for converting an output voltage of the external power supply into a driving voltage required by the LED;
a driving unit having an output terminal connected to a controlled terminal of the voltage converting unit for driving the voltage converting unit to achieve a voltage conversion;
a protection unit connected in series between a negative electrode of the LED and a first input terminal of the driving unit;
a current detection unit connected to a second input terminal of the driving unit for connecting to the circuit protection unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and
control unit having an input terminal connected to the negative electrode of the LED and an output terminal connected to a third input terminal of the driving unit, wherein the control unit is for outputting a control signal for stopping working to the driving unit when the protection unit forms the open circuit;
wherein,
the driving unit comprises a controller, a first comparator, and a first switching transistor, wherein an output terminal of the controller functions as the output terminal of the driving unit and connects to the controlled terminal of the voltage converting unit, and an input terminal of the controller functions as the third input terminal of the driving unit and connects to the control unit;
a positive input terminal of the first comparator is for inputting a first preset voltage, and a negative input terminal of the first comparator functions as the second input terminal of the driving unit and connects to the current detection unit;
an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator; and the control unit is a second comparator, and a negative input terminal of the second comparator connects to the negative electrode of the LED, and a positive input terminal of the second comparator is for inputting a second preset voltage, and an output terminal of the second comparator functions as the output terminal of the control unit and connects to the third input terminal of the driving unit.

2. The LED backlight driving circuit according to claim 1, wherein,
the protection unit is a first resistor which has a resistance less than a preset value, and the first resistor has two terminals, and one terminal of the first resistor connects to the negative electrode of the LED, and the other terminal of the first resistor connects to the first input terminal of driving unit; and
the current detection unit is a second resistor, and the second resistor has two terminals, and one terminal of the second resistor connects to the second input terminal of the driving unit, and the other terminal of the second resistor is grounded.

3. The LED backlight driving circuit according to claim 2, wherein,
the voltage converting unit is an inductive boost circuit, and includes a boost inductor, a second switching transistor, a rectifier diode and a discharge capacitor;
wherein, one terminal of the boost inductor is the input terminal of the voltage converting unit for connecting the output terminal of the external power supply, and the other terminal of the boost inductor connects to a positive electrode of the rectifier diode, and a negative electrode of the rectifier diode is the output terminal of the voltage converting unit and connects to the positive electrode of the LED, and a control terminal of the second switching transistor is the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge the capacitor is grounded.

4. The LED backlight driving circuit according to claim 2, wherein,
the first switching transistor and the second switching transistor are all thin-film-field-effect transistors, and each control terminal of switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

5. An LED backlight driving circuit comprising:
a voltage converting unit having an input terminal connected to an output terminal or an external power supply and an output terminal connected to a positive electrode of an LED, wherein the voltage converting unit is for converting an output voltage of the external power supply into a driving voltage required by the LED;
a driving unit having an output terminal connected to a controlled terminal of the voltage converting unit for driving the voltage converting unit to achieve a voltage conversion;
a protection unit connected in series between a negative electrode of the LED and a first input terminal of the driving unit;
a current detection unit connected to a second input terminal of the driving unit for connecting to the circuit protection unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and
a control unit having an input terminal connected to the negative electrode of the LED and an output terminal connected to a third input terminal of the driving unit, wherein the control unit is for outputting a control signal for stopping working to the driving unit when the protection unit forms the open circuit.

6. The LED backlight driving circuit according to claim 5, wherein,
the protection unit is a first resistor which has a resistance less than a preset value, and the first resistor has two terminals, and one terminal of the first resistor connects to the negative electrode of the LED, and the other terminal of the first resistor connects to the first input terminal of driving unit; and
the current detection unit is a second resistor, and the second resistor has two terminals, and one terminal of the second resistor connects to the second input terminal of the driving unit, and the other terminal of the second resistor is grounded.

7. The LED backlight driving circuit according to claim 6, wherein,
the driving unit comprises a controller, a first comparator, and a first switching transistor, wherein an output terminal of the controller functions as the output terminal of the driving unit and connects to the controlled terminal of the voltage converting unit, and an input terminal of the controller functions as the third input terminal of the driving unit and connects to the control unit;
a positive input terminal of the first comparator is for inputting a first preset voltage, and a negative input terminal of the first comparator functions as the second input terminal of the driving unit and connects to the current detection unit;
an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator.

8. The LED backlight driving circuit according to claim 7, wherein,
the voltage converting unit is an inductive boost circuit, and includes a boost inductor, a second switching transistor, a rectifier diode and a discharge capacitor;
wherein, one terminal of the boost inductor is the input terminal of the voltage converting unit for connecting the output terminal of the external power supply, and the other terminal of the boost inductor connects to a positive electrode of the rectifier diode, and a negative electrode of the rectifier diode is the output terminal of the voltage converting unit and connects to the positive electrode of the LED, and a control terminal of the second switching transistor is the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge the capacitor is grounded.

9. The LED backlight driving circuit according to claim 8, wherein,
the first switching transistor and the second switching transistor are all thin-film-field-effect transistors, and each control terminal of switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

10. The LED backlight driving circuit according to claim 6, wherein,
the control unit is a second comparator, and a negative input terminal of the second comparator connects to the negative electrode of the LED, and a positive input terminal of the second comparator is for inputting a second preset voltage, and an output terminal of the second comparator functions as the output terminal of the control unit and connects to the third input terminal of the driving unit.

11. An LED backlight module, comprising
an LED; and
an LED backlight driving circuit comprising:
a voltage converting unit having an input terminal connected to an output terminal of an external power supply and an output terminal connected to a positive electrode of an LED, wherein the voltage converting unit is for converting an output voltage of the external power supply into a driving voltage required by the LED;
a driving unit having an output terminal connected to a controlled terminal of the voltage converting unit for driving the voltage converting unit to achieve a voltage conversion;
a protection unit connected in series between a negative electrode of the LED and a first input terminal of the driving unit;
a current detection unit connected to a second input terminal of the driving unit for connecting to the circuit protection unit through the driving unit and used for detecting a value of a current flowing through the LED, wherein a maximum allowable power of the protection unit is less than a power when the driving voltage of the LED is directly applied to the protection unit so as to form an open circuit when the positive and negative electrodes of the LED are shorted in order to cut off a connection between the LED and the driving unit; and
a control unit having an input terminal connected to the negative electrode of the LED and an output terminal connected to a third input terminal of the driving unit, wherein the control unit is for outputting a control signal for stopping working to the driving unit when the protection unit forms the open circuit.

12. The LED backlight module according to claim 11, wherein,
the protection unit is a first resistor which has a resistance less than a preset value, and the first resistor has two terminals, and one terminal of the first resistor connects to the negative electrode of the LED, and the other terminal of the first resistor connects to the first input terminal of driving unit; and
the current detection unit is a second resistor, and the second resistor has two terminals, and one terminal of the second resistor connects to the second input terminal of the driving unit, and the other terminal of the second resistor is grounded.

13. The LED backlight module according to claim 12, wherein,
the driving unit comprises a controller, a first comparator, and a first switching transistor, wherein an output terminal of the controller functions as the output terminal of the driving unit and connects to the controlled terminal of the voltage converting unit, and an input terminal of the controller functions as the third input terminal of the driving unit and connects to the control unit;
a positive input terminal of the first comparator is for inputting a first preset voltage, and a negative input terminal of the first comparator functions as the second input terminal of the driving unit and connects to the current detection unit;
an output terminal of the first comparator connects to a control terminal of the first switching transistor, and an input terminal of the first switch functions as the first input terminal of driving unit and connects to the protection unit, and an output terminal of the first switching transistor connects to the negative input terminal of the first comparator.

14. The LED backlight module according to claim 13, wherein,
the voltage converting unit is an inductive boost circuit, and includes a boost inductor, a second switching transistor, a rectifier diode and a discharge capacitor;
wherein, one terminal of the boost inductor is the input terminal of the voltage converting unit for connecting the output terminal of the external power supply, and the other terminal of the boost inductor connects to a positive electrode of the rectifier diode, and a negative electrode of the rectifier diode is the output terminal of the voltage converting unit and connects to the positive electrode of the LED, and a control terminal of the second switching transistor is the controlled terminal of the voltage converting unit and connects to the output terminal of the driving unit, and an output terminal of the second switching transistor is grounded, and one terminal of the discharge capacitor connects to the negative terminal of the rectifier diode, and the other terminal of the discharge the capacitor is grounded.

15. The LED backlight module according to claim 14, wherein,
the first switching transistor and the second switching transistor are all thin-film-field-effect transistors, and each control terminal of switching transistor corresponds to a gate of the thin-film-field-effect transistor, and each input terminal of switching transistor corresponds to a drain of the thin-film-field-effect transistor, and each output terminal of switching transistor corresponds to a source of the thin-film-field-effect transistor.

16. The LED backlight module according to claim 12, wherein,
the control unit is a second comparator, and an negative input terminal of the second comparator connects to the negative electrode of the LED, and a positive input terminal of the second comparator is for inputting a second preset voltage, and an output terminal of the second comparator functions as the output terminal of the control unit and connects to the third input terminal of the driving unit.

* * * * *